(12) United States Patent
Lau

(10) Patent No.: US 6,850,023 B2
(45) Date of Patent: Feb. 1, 2005

(54) METHOD OF MEASURING MOTOR SPEED

(75) Inventor: James Ching Sik Lau, Hong Kong (CN)

(73) Assignee: Johnson Electrics S.A., La Chaux-de-fonds (CH)

( * ) Notice: Subject to any disclaimer, the term of this patent is extended or adjusted under 35 U.S.C. 154(b) by 112 days.

(21) Appl. No.: 10/321,364

(22) Filed: Dec. 18, 2002

(65) Prior Publication Data

US 2003/0113105 A1 Jun. 19, 2003

(30) Foreign Application Priority Data

Dec. 18, 2001 (GB) .............................. 0130150

(51) Int. Cl.[7] .............................................. G01P 3/481
(52) U.S. Cl. ..................................... 318/463; 388/910
(58) Field of Search ................................. 318/244, 245, 318/461, 462, 463, 464; 388/910, 912

(56) References Cited

U.S. PATENT DOCUMENTS

| | | | |
|---|---|---|---|
| 3,790,832 A | * | 2/1974 | Patel .......................... 310/113 |
| 3,967,200 A | | 6/1976 | Tetsugu et al. |
| 4,082,968 A | * | 4/1978 | Jones ....................... 310/68 B |
| 4,138,642 A | | 2/1979 | Mohr |
| 4,166,248 A | * | 8/1979 | Bianchi et al. ............. 327/102 |
| 4,215,298 A | * | 7/1980 | Bigley et al. ............... 388/820 |
| 4,418,307 A | | 11/1983 | Hoffmann et al. |
| 4,591,768 A | * | 5/1986 | Kudelski .................... 388/820 |
| 4,651,241 A | | 3/1987 | von der Heide et al. |
| 4,914,713 A | | 4/1990 | Mueller et al. |
| 5,079,468 A | | 1/1992 | Sata |
| 5,400,191 A | * | 3/1995 | Sakaguchi et al. ....... 360/73.03 |
| 5,925,950 A | | 7/1999 | Lau |
| 6,208,132 B1 | | 3/2001 | Kliman et al. |
| 6,289,072 B1 | * | 9/2001 | Hubbard et al. .............. 377/20 |
| 6,703,731 B2 | * | 3/2004 | Lee .......................... 310/68 B |

FOREIGN PATENT DOCUMENTS

| | | |
|---|---|---|
| DE | 121191 | 7/1976 |
| DE | 32 34 683 A1 | 3/1984 |
| DE | 43 27 033 A1 | 2/1995 |
| DE | 196 02 362 A1 | 7/1997 |
| DE | 196 48 402 A1 | 5/1998 |
| EP | 1 180 847 A1 | 2/2000 |
| GB | 2 158 273 A | 11/1985 |
| JP | 55-113956 | 9/1980 |
| JP | 63213494 A | 9/1998 |
| SU | 817880 A | 3/1981 |

OTHER PUBLICATIONS

Birk, "Unkonventionelle Drehzahimessung und–regelung bei Gleichstrommotoren," Elektronik, vol. 33, No. 25, Dec. 1, 1984, Munchen, Germany, with English translation thereof.

* cited by examiner

*Primary Examiner*—Bentsu Ro
(74) *Attorney, Agent, or Firm*—Birch, Stewart, Kolasch & Birch, LLP

(57) ABSTRACT

A speed sensor for an electric motor detects the variation in the electric field of the armature due to commutation to produce an output signal indicative of the speed of rotation of the motor.

13 Claims, 1 Drawing Sheet

METHOD OF MEASURING MOTOR SPEED

This invention relates to a method of sensing the speed of an electric motor with a wound rotor, in particular a PMDC motor and to apparatus for performing the method.

There are a number of methods used to sense the rotational speed of an electric motor. A Hall effect sensor may sense the rotation of a magnet attached to the shaft or rotor core and an optical sensor may detect the rotation of a disc or light and dark sections of the rotor core. These options are expensive but generally reliable.

Other options include monitoring motor current for commutation spikes and detecting changes in magnetic field strength due to rotation of the rotor within the magnetic field of the stator. While cheaper, and can be successful in clean environments, these methods are prone to false readings in electrically noisy environments and often become unusable towards the end of motor life due to the increase in electrical noise generated by the brushes.

Thus, there is a need for a cheap but reliable method for sensing the speed of an electric motor.

Accordingly, the present invention provides a method of producing a signal indicative of rotational speed of a PMDC motor having a wound rotor, comprising the steps of: producing a raw signal by measuring the electromagnetic emission of the rotor; producing a second signal by filtering the raw signal to isolate electromagnetic activity of the wound rotor, including spikes associated with commutation events; and producing an output signal by processing the second signal to change the spikes into square pulses.

According to a second aspect, the present invention provides a PMDC motor comprising: a permanent magnet stator; a wound rotor confronting the stator; a speed sensor comprising a sensor coil located spaced from the rotor but in an electromagnetic field produced by the rotor and producing a raw input signal when the motor is in use, and a signal processing circuit connected to the coil for receiving the raw input signal and producing a speed indicative output signal, the circuit including a filter for filtering the input signal and a signal modifier to convert the filtered signal into an output signal, wherein the signal modifier comprises a square pulse generator triggered by spikes in the filtered signal to produce a pulse train output signal.

Preferred and/or optional features are defined in the dependent claims.

One preferred embodiment of the present invention will now be described, by way of example only, with reference to the accompanying drawings, in which.

The present invention uses a pickup coil 20 to sense the rotation of the motor. The principle of operation is fundamentally different from current prior art speed sensors using a pickup coil. The present invention uses a pickup coil, which is a coil of conductive wire, preferably but not necessarily, a helical coil of insulated copper wire wound around a steel pin. This coil is placed near the wound rotor of the motor. The exact location is not critical but the closer to the motor windings, the stronger the signal. However, the coil can be located outside of the motor in at least some applications.

The coil 20 picks up variations in the magnetic field produced by the rotor as a result of commutation events. In practice, the coil will pick up any variation in magnetic field at the location where it is placed. This variation in magnetic field produces an electrical signal in the form of a changing voltage across the terminals of the coil. This is the raw sensor signal 21 (shown in FIG. 3A).

Figure 1:
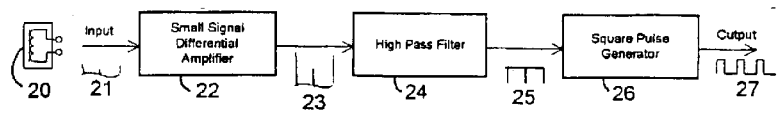
FIG. 1 is a block diagram of the preferred signal processing method.

This raw sensor signal is passed to an electronic filtering and reshaping circuit represented by the block diagram of FIG. 1. By placing the sensor coil near the rotor windings, the coil picks up variations caused by the change in electric current passing through the rotor windings as the coils are turned on and off as the rotor rotates. As every conductor passing current creates a magnetic field, the changing current through the coils of the rotor windings generates a changing magnetic field which is picked up by the sensor coil acting as an air coupled transformer even though it has a steel pin core, the steel pin and the rotor core are separated by an air gap.

It is this changing magnetic field that we wish to monitor. However, the sensor coil also picks up variations in the magnetic field of the stator, caused by the rotation of the rotor core within the magnetic field of the stator. This additional changing magnetic field and others create unwanted signals which constitute noise with a low frequency dynamic and the electronic circuit removes this noise from the raw signal.

So, the raw signal 21 is passed to a small signal differential amplifier 22 to increase the signal strength. Although the amplifier also increases the strength of the noise, its high gain can limit the conducted EMI from sensor 20. The amplified raw signal 23 is then passed through a high pass filter 24 to eliminate the noise component and its spikes are converted into a triggering signal 25. This signal 25 can be used to determine the speed of the motor by measuring the time between the spikes.

However, it is easier to measure the time difference between square pulses, so the triggering signal 25 then triggers a square pulse generator 26 to produce a train of square pulses 27 of predetermined pulse width and corresponding in time to the spikes. The amplitude is TTL compatible and the pulse width is chosen so as not to overlap at maximum speed of the motor.

The output signal 27 is thus a pulse train whereby the instantaneous speed of the motor can be determined by measuring the time period between leading (or trailing) edges of adjacent pulses and taking into account the number of pulses per revolution of the motor being monitored.

Figure 2:
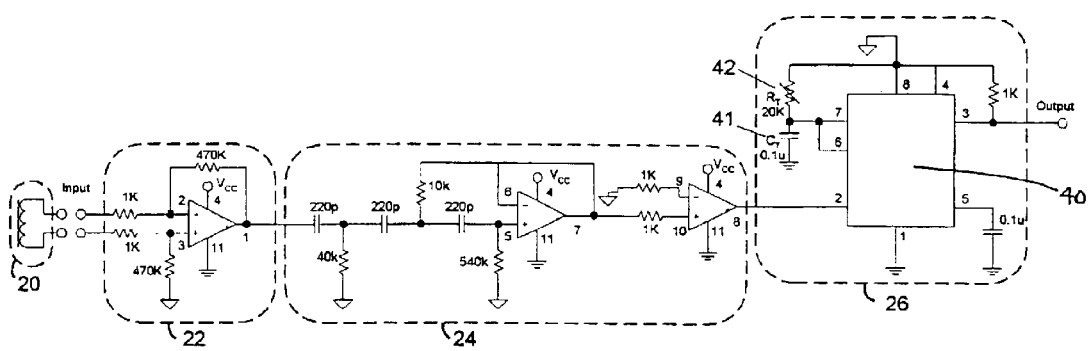
FIG. 2 is a schematic circuit diagram illustrating a preferred circuit embodiment for carrying out the method of FIG. 1.

FIG. 2 illustrates circuitry for implementing the block diagram steps of FIG. 1 in a low cost version. As can be seen, the circuit can be simple with only three op amps and one IC plus a few discrete components. The square pulse generator 26 uses a 555 chip 40 with a $0.1\mu$ cap ($C_T$) 41 and a 20 k trimmer ($R_T$) 42 to set the pulse width which is determined by $1.1\ R_T C_T$.

Figure 3:
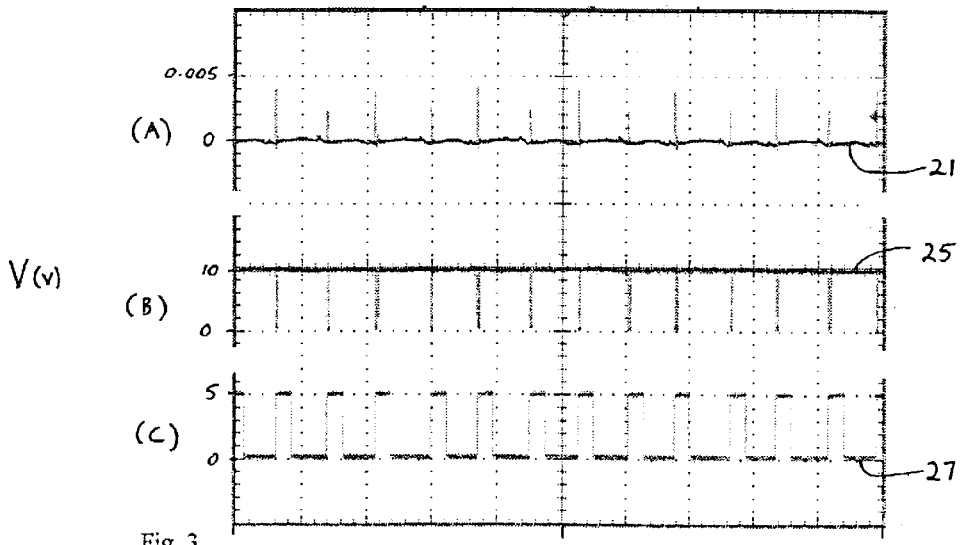
FIG. 3 are signal waveforms illustrating the shape of the signal as it passes through the circuit of FIG. 2.

FIG. 3 illustrates three waveforms taken at various stages along the circuit to show how the signal is modified as it passes through the circuit. Waveform (A) is the raw signal 21, waveform (B) is the triggering signal 25 and waveform (C) is the output signal 27. The wave forms have a common time axis but as the voltages are able to be changed according to coil placement, motor type and amplifier settings, and to aid clarity, they have been given separate y-axes.

What can be seen is that in the raw input signal 21, the spikes are superimposed on the low frequency magnetic field noise component and that the spikes are aligned with the leading edge of the square pulse wave train.

Also, the raw signal 21 has a very low signal strength but by amplifying the signal and then using a high pass filter, the triggering signal 25 becomes very clean and the signal strength is improved. The reshaping process produces a strong clean steady output signal 27 suitable for a speed control circuit, which is reliable and simple.

The embodiment described above is given by way of example only and various modifications will be apparent to persons skilled in the art without departing from the scope of the invention as defined in the appended claims.

What is claimed is:

1. A method of producing a signal indicative of rotational speed of a PMDC motor having a wound rotor, comprising the steps of:
   producing a raw signal by measuring the electromagnetic emission of the motor;
   producing a second signal by filtering the raw signal to isolate electromagnetic activity of the wound rotor, including spikes associated with commutation events; and
   producing an output signal by processing the second signal to change the spikes into square pulses.

2. The method of claim 1 wherein the square pulses have a predetermined constant width.

3. The method of claim 1 wherein the output signal is amplified to produce a pulse train with a predetermined output voltage.

4. The method of claim 1 wherein the raw signal is produced by placing a coil near to and within the electromagnetic field of the rotor.

5. The method of claim 4 wherein a steel pin is used as a core for the coil.

6. The method of claim 1 wherein the second signal is produced by passing the raw signal through a high pass filter.

7. The method of claim 6 wherein the raw signal is amplified before passing through the high pass filter.

8. A PMDC motor comprising:
   a permanent magnet stator;
   a wound rotor confronting the stator;
   a speed sensor comprising a sensor coil located spaced from the rotor but in an electromagnetic field produced by the rotor and producing a raw input signal when the motor is in use; and
   a signal processing circuit connected to the coil for receiving the raw input signal and producing an output signal indicative of motor speed, the circuit including a filter for filtering the input signal and a signal modifier to convert the filtered signal into the output signal,
   wherein the signal modifier comprises a square pulse generator triggered by spikes in the filtered signal to produce a pulse train as the output signal.

9. The motor of claim 8 wherein the filter comprises an amplifier for amplifying the raw signal and a high pass filter to remove low noise frequency.

10. The motor of claim 8 wherein the square pulse generator generates pulses of a predetermined fixed pulse width.

11. The motor of claim 8 wherein the output signal is TTL compatible.

12. The motor of claim 8 wherein the coil has a ferrite core.

13. The motor of claim 8 wherein the coil is a chip type coil.

* * * * *